United States Patent [19]

Tanaka et al.

[11] Patent Number: 5,149,952
[45] Date of Patent: Sep. 22, 1992

[54] OPTICAL GAUGING APPARATUS USING DUAL BEAMS AND INTERMITTENT INTERRUPTION

[75] Inventors: Hirokazu Tanaka; Kiyomitsu Ishikawa, both of Tokyo; Tomohiro Yamaguchi, Yokohama, all of Japan

[73] Assignee: Stanley Electric Corporation, Tokyo, Japan

[21] Appl. No.: 732,636

[22] Filed: Jul. 19, 1991

[30] Foreign Application Priority Data

Aug. 10, 1990 [JP] Japan .................................. 2-210337
Aug. 24, 1990 [JP] Japan .................................. 2-220967

[51] Int. Cl.$^5$ ............................................. G01N 21/86
[52] U.S. Cl. ..................................... 250/561; 356/4
[58] Field of Search ................. 250/561, 201.4; 356/1, 356/4, 5, 141, 152

[56] References Cited

U.S. PATENT DOCUMENTS 4,465,366  8/1984  Schmidt .................................. 356/4
4,888,490  12/1989  Bass et al. ............................. 250/561
5,056,913  10/1991  Tanaka et al. ......................... 356/4

*Primary Examiner*—David C. Nelms
*Assistant Examiner*—K. Shami
*Attorney, Agent, or Firm*—Spensley Horn Jubas & Lubitz

[57] ABSTRACT

Here is disclosed an optical gauging apparatus utilizing light reflected on an object to be gauged and being useful for gauging of, for example, car level, spring deflection and photographic distance. Light emitted from a single light source is split into a pair of light components propagated along a pair of optical paths, respectively, the light components thus split are projected along different optical path lengths onto the object, at least one of the light components is intermittently shielded and the light components reflected on the object are photoelectrically converted to the corresponding photoelectric conversion signals which are then time-division processed so as to provide a desired gauging information.

10 Claims, 8 Drawing Sheets

OPTICAL GAUGING APPARATUS USING DUAL BEAMS AND INTERMITTENT INTERRUPTION

BACKGROUND OF THE INVENTION

1. Field of the Invention

The present invention relates to an optical gauging apparatus utilizing the light reflected on an object to be gauged and being useful for gauging of, for example, car level, spring deflection and photographic distance.

2. Background Art

There have already been proposed various gauging apparatuses utilizing the light reflected on an object to be gauged, an example of which is schematically shown by FIG. 15 of the accompanying drawing.

This example of prior art includes a pair of point light sources 11, 12 used to illuminate an object 13 to be gauged.

The light reflected on the object 13 is incident on a light receiver 14 adapted to be exposed alternately to one light component emitted from the one light source 11 and then reflected on the object 13, on one hand, and another light component emitted from the other light source 12 and then reflected on the object 13, on the other hand. The light receiver 14 generates photoelectric conversion signals Sp, Ss corresponding to quantities of the reflected light components derived from the respective light sources 11, 12 and then received by this light receiver 14.

With such optical gauging apparatus of well known art, the object 13 has two different luminances Ep, Es based on the light components projected from the respective light sources 11, 12, because of a differential optical path length as shown in FIG. 16. Thus, surface luminances (nits) on the object 13 correspond to KEp and KEs, respectively, where K represents a reflection factor of the object 13. Accordingly, ratio of these surface luminances is expressed as follows:

$$Ep/Es \propto Sp/Ss \quad (1)$$

Therefore, a distance D to the object 13 can be determined by processing the photoelectric conversion signals Sp, Ss as functions of the distance.

The above-mentioned optical gauging apparatus of prior art is very advantageous in that the distance can be determined from the ratio of the surface luminances on the object 13 regardless the reflection factor K of the object 13, as will be apparently understood from said equation (1).

However, this apparatus of prior art uses a pair of light sources 11, 12 and will encounter a problem when intensities of the light components projected from these light sources 11, 12 vary at different rates, respectively, due to various causes such as deterioration thereof.

No problem occurs so far as the intensities of the light components projected from these light sources 11, 12 vary at a same rate, but variation of said intensities occurring at different rates will cause a false result of gauging.

SUMMARY OF THE INVENTION

It is a principal object of the present invention to solve said problem by improving the above-mentioned apparatus so as to make light projection from a single light source.

The present invention resides in an optical gauging apparatus comprising splitter means to split the light coming from a single light source into a pair of light components propagated along a pair of optical paths, respectively; projector means to project these light components having been splitted by the splitter means along a pair of optical paths having different lengths onto an object to be gauged; shield means for intermittently shielding at least one light component propagated along one of the optical paths; and signal processor means for photoelectric conversion of the light components reflected on the object followed by time-division processing of the photoelectric conversion signals so as to provide a desired gauging information.

With this gauging apparatus, the light emitted from the single light source is splitted into a pair of light components propagated along a pair of optical paths, respectively, the light components thus splitted are then projected along different optical path lengths onto the object, at least one of the light components is intermittently shielded and the light components reflected on the object are photoelectrically converted to the corresponding photoelectric conversion signals which are then time-division processed so as to provide a desired gauging information. Such arrangement realizes a gauging apparatus which is substantially free from a false result of gauging even when the intensity of the light projected from the light source varies due to various causes such as deterioration thereof.

The present invention resides also in an optical gauging apparatus comprising light emitter means for alternately emitting a pair of light components having different polarization characteristics; splitter means to split the pair of light components having been emitted from the light emitter means into a pair of different optical paths; projector means to project the light components having been splitted by said splitter means along a pair of optical paths having different lengths onto an object to be gauged; and signal processor means adapted for, upon reception of the light components reflected on the object and photoelectric conversion thereof, followed by time-division processing of the photoelectric conversion signals so as to provide a desired gauging information.

With this gauging apparatus, the pair of light components having different polarization characteristics are emitted, these light components are then splitted into a pair of different optical paths, respectively, the light components thus splitted are projected along a pair of optical paths having different lengths onto the object to be gauged, and the light components reflected on the object are photoelectrically converted to the corresponding photoelectric conversion signals which are then time-division processed so as to provide a desired gauging information. This arrangement also realizes a gauging apparatus which is substantially free from a false result of gauging even when the intensity of light projected from the light source varies due to various casues such as deterrioration thereof.

DESCRIPTION OF THE PREFERRED EMBODIMENTS

Now preferred embodiments of the invention will be described in reference with the accompanying drawing.

A first embodiment of the invention is illustrated by FIGS. 1 through 6.

Figure 1:
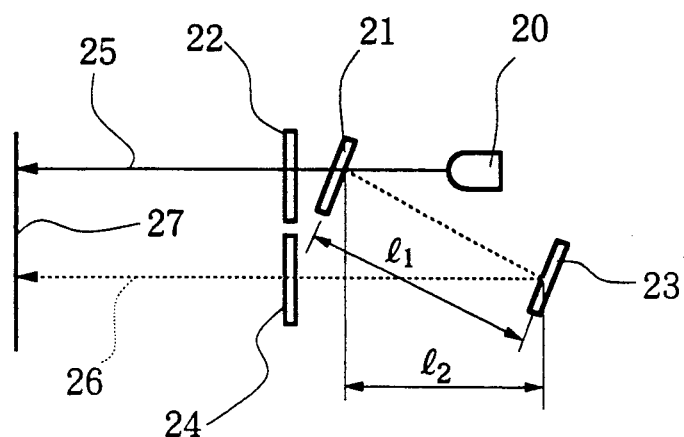
FIG. 1 is a schematic diagram showing projector means, splitter means and shield means arranged in a first embodiment of the invention.

Referring to FIG. 1, projector means, splitter means and shield means are shown, wherein there are placed on an optical axis of a light source 20 a half-mirror 21 and a liquid crystal plate 22, on one hand, and there are placed on a straight line extending in parallel to the optical axis of the light source 20 a total reflection mirror 23 and another liquid crystal plate 24, on the other hand.

Light emitted from the light source 20 which comprises LED is propagated by the half-mirror 21 and the liquid crystal plate 22 along an optical path 25 and partially reflected on the half-mirror 21 so as to be directed to the total reflection mirror 23.

Specifically, the half-mirror 21 is tilted with respect to the optical path 25 so that the half-mirror 21 extends in parallel to the total reflection mirror 23. In a consequence, the light having been reflected on the half-mirror 21 is then reflected on the total reflection mirror 23 and then projected by the liquid crystal plate 24 along an optical path 26.

It should be understood that the total reflection mirror 23 is spaced from the half-mirror 21 by a distance $l_1$ and there is a differential optical path length of $l_1 + l_2$ between the optical paths 25, 26.

Meanwhile, the liquid crystal plates 22, 24 are adapted to shield the light incident thereon when energized by a driver (not shown) and to transmit it when deenergized. In this manner, the liquid crystal plates 22, 24 may be alternately actuated to achieve desired projection from the respective liquid crystal plates 22, 24 occurring at a timing as illustrated by (a) and (b) of FIG. 2.

Figure 2:
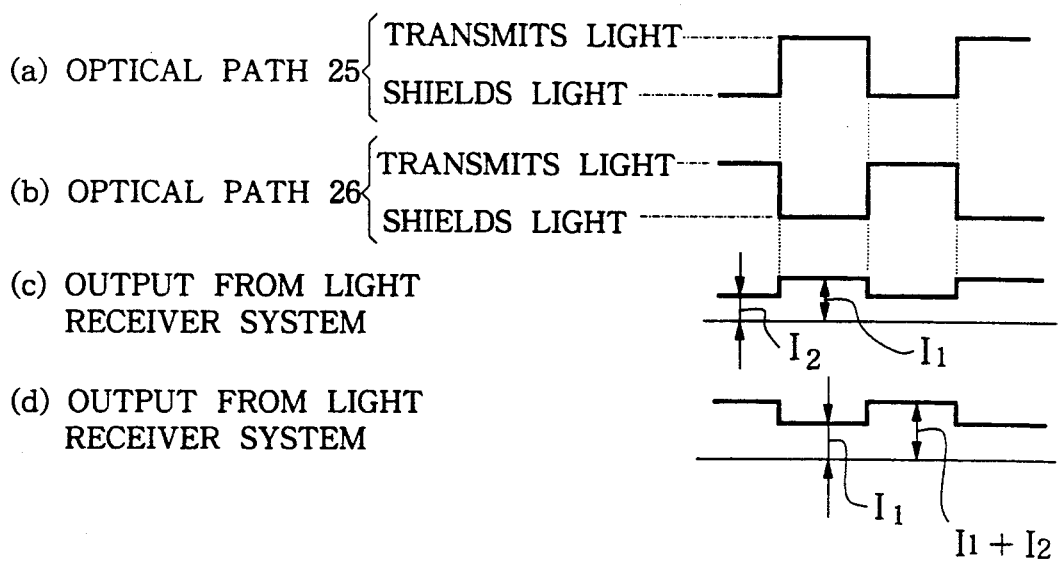
FIG. 2 is a waveform diagram illustrating how the gauging apparatus according to this embodiment operates.

In response to such projection a light receiver system adapted to be exposed to the light components reflected on an object 27 to be gauged outputs photoelectrically converted currents $I_1$, $I_2$ as illustrated by (c) of FIG. 2.

It should be understood that $I_1$ is derived from the light propagated along the optical path 25 and then reflected on the object 27 while $I_2$ is derived from the light component propagated along the optical path 26 and then reflected on the object 27.

The light component projected along the optical path 26 has the intensity lower than the light component projected along the optical path 25 because the optical path 26 is longer than the optical path 25. Correspondingly, the photoelectrically converted current $I_1 >$ the photoelectrically converted current $I_2$.

FIG. 2 illustrates in (d) the phtoelectrically converted current output from the light receiver system when the system is provided only with the liquid crystal plate 24.

With such arrangement, the optical path 25 continues to propagate the associated light component projected onto the object 27. Accordingly, the light receiver system receives only the light component projected along the optical path 25 and reflected on the object 27 when the liquid crystal plate 24 shields the associated light component, and receives the light component projected along both the optical path 25, 26 and then reflected on the object 27, resulting in the waveform as illustrated by (d) of FIG. 2.

Figure 3:
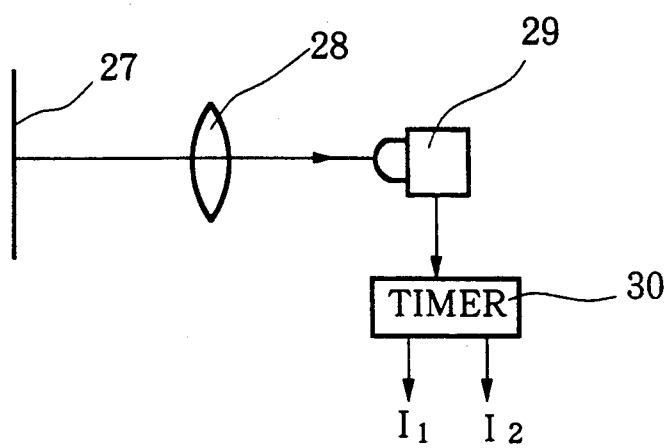
FIG. 3 is a schematic diagram showing by way of example a light receiver system in this embodiment.

Referring to FIG. 3, an example of the light receiver system serving to determine luminances on the object 27 is illustrated.

As will be apparent from FIG. 3, the light receiver system comprises a condenser 28, a light receiver element 29 and a timer 30, wherein the light components having been reflected on the object 27 are condensed by the condenser 28 and the condensed light components are then received by the light receiver element 29.

The light receiver element 29 generates the photoelectrically converted currents $I_l$, $I_2$ corresponding to the quantities of the respective light components received thereby. More specifically, these phtoelectrically converted currents $I_l$, $I_2$ are output through the timer 30 adapted to sort the signals in accordance with the actuation timing of the liquid crystal plates 22, 24.

Figure 4:
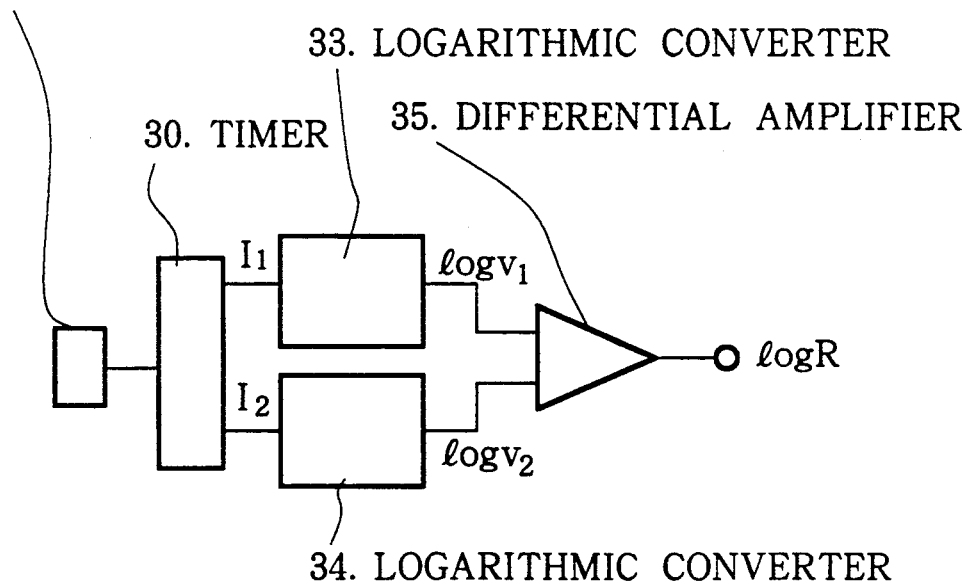
FIG. 4 is a block diagram showing by way of example signal processor means in this embodiment.

FIG. 4 is a circuit diagram illustrating an embodiment of the signal processor means comprising logarithmic converters 33, 34 and a differential amplifier 35.

The one logarithmic converter 33 serves to convert the photoelectrically converted current $I_1$ output from the light receiver element 29 to corresponding voltage $V_l$, utilizing suitable means and then to achieve logarithmic conversion of this voltage $V_l$.

Similarly, the other logarithmic converter 34 serves to convert the photoelectrically converted current $I_2$ output from the light receiver element 29 to corresponding voltage $V_2$ and then to achieve logarithmic conversion of this voltage $V_2$.

The differential amplifier 35 is supplied from the respective logarithmic converters 33, 34 with respective logarithmically converted voltages (log $V_1$, log $V_2$) and outputs a differential voltage (log $V_1$ - log $V_2$ = log R) as an information on the gauged distance.

Said signal processor means operates to derive $$V_1/V_2 = R$$

on the basis of a relationship $$E_1/E_2 \propto V_1/V_2,$$

and determine logarithms of right and left sides of the above formula $V_1/V_2=R$ as follows:

i.e., $$\log V_1 - \log V_2 = \log R.$$

According to this embodiment, the light components respectively projected along the optical paths 25, 26 having different lengths are alternately shielded, then a differential luminance on the object 27 illuminated by the light components projected along the respective optical paths 25, 26 is calculated as a difference in the intensities of these light components projected along the respective optical paths and then received by the light receiver element 29, and there a distance to the object 27 is determined.

Figure 5:
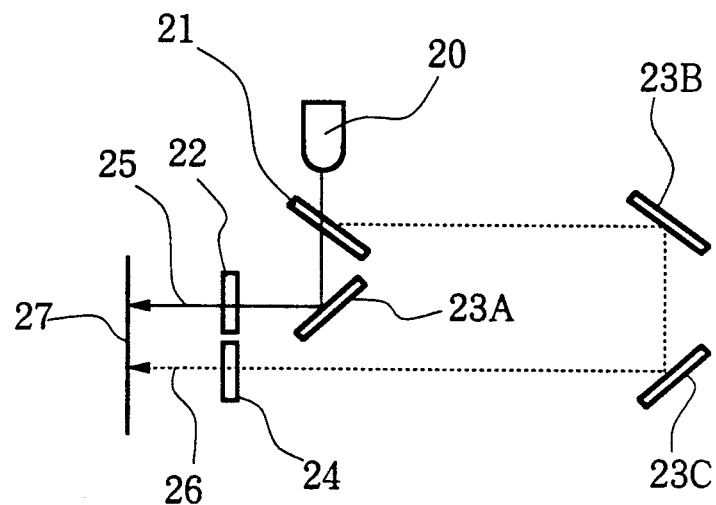
FIG. 5 is a schematic diagram showing a variant of the projector system.

It is possible to obtain such distance information from the differential intensity of the light components received by the light receiver element also when, as schematically illustrated by FIG. 5, there are provided the half-mirror 21, a mirror 23A and the liquid crystal plate 22 in the optical path 25 while there are provided mirrors 23B, 23C and the liquid crystal plate 24 in the optical path 26 so that the light component having been reflected on the half-mirror 21 is projected by the mirrors 23B, 23C and the liquid crystal plate 24 onto the object 27, so long as the liquid crystal plates 22, 24 are alternately actuated in the same manner as in the previously mentioned arrangement, since there occurs a differential length between the optical paths 25, 26.

Figure 6:
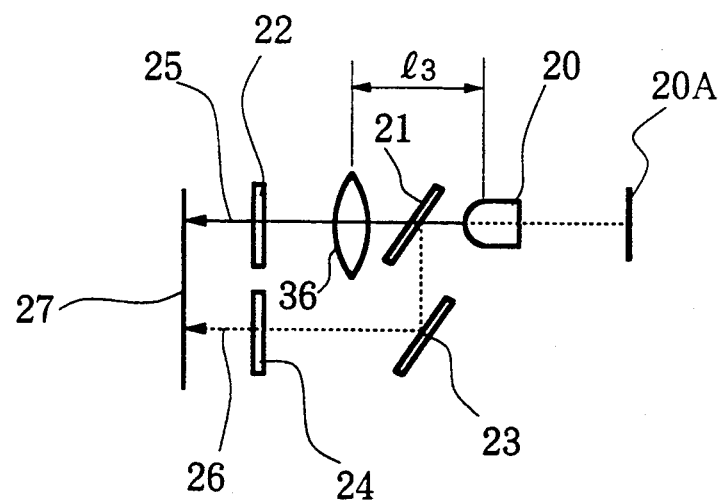
FIG. 6 is a schematic diagram showing another variant of the projector system.

This is true also in an arrangement as schematically illustrated by FIG. 6. According to this variant, a convex lens 36 is placed in the optical path 25 relative to the light source 20 with a distance 13 between the light source 20 and the convex lens 36 being smaller than a focal distance f of said convex lens 36 and the total reflection mirror 23 is placed in parallel to the half-mirror 21 so that one of the light components emitted from the light source 20 is projected by the half-mirror 21, the convex lens 36 and the liquid crystal plate 22 and the other light component is projected by the half-mirror 21, the total reflection mirror 23 and the liquid crystal plate 24. Also with such arrangement, it is possible to obtain a distance information from a differential intensity of the light components depending on a differential length of the optical paths.

In this variant, a virtual image 20A of the light source 20 serves as the apparent light source and the distance information can be obtained on the basis of this virtual image 20A.

It is also possible to employ the signal processor means adapted to subject the photoelectric conversion signals to A/D conversion for a subsequent digital processing or the signal processor means adapted to make the signal processing by means of a divider.

As will be apparent from (a) and (b) of FIG. 2, it is unnecessary that light transmission and light shielding by the one liquid crystal plate 22 concur with light shielding and light transmission by the other liquid crystal plate 24, respectively, because the present invention will be effectively implemented so long as operating modes of these liquid crystal plates 22, 24 do not mutually overlap.

A second embodiment of the present invention is illustrated by FIGS. 7 through 14.

Figure 7:
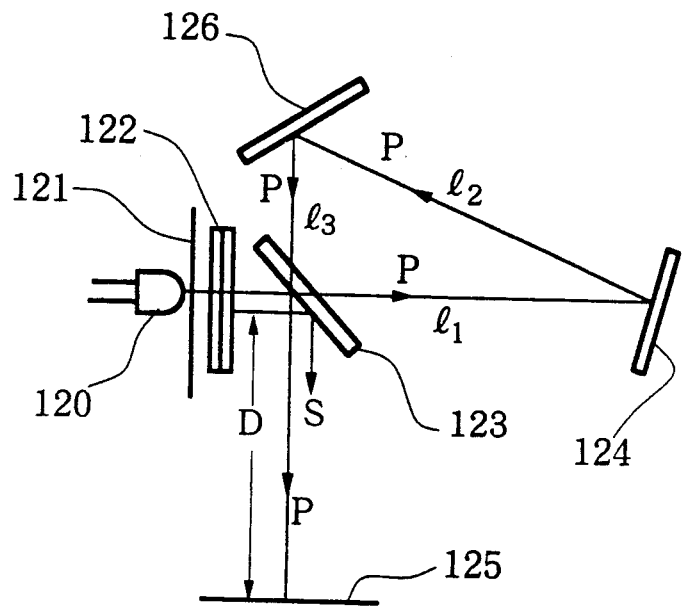
FIG. 7 is a schematic diagram showing light emitter means, splitter means and projector means arranged for a second embodiment of the invention.

Referring to FIG. 7 showing light emitter means, splitter means and projector means, there are provided on an optical axis of a light source 120 comprising LED a polarizing plate 121, a liquid crystal plate 122 of TN (Twisted Nematic) type, a polarizing beam splitter mirror 123 and a total reflection mirror 124.

An additional total reflection mirror 126 is provided on a straight line extending between an object 125 to be gauged and said polarizing beam splitter mirror 123. The mirror 123 is spaced from the total reflection mirror 124 by $l_1$, the total reflection mirror 124 is spaced from the total reflection mirror 126 by $l_2$ and the total reflection mirror 126 is spaced from the mirror 123 by $l_3$.

Figure 8:
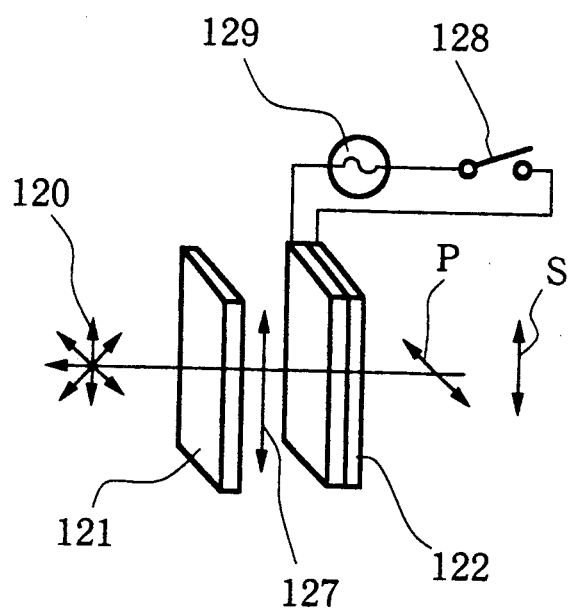
FIG. 8 is a schematic diagram illustrating how the splitter means and the projector means operates in this embodiment.

Referring to FIG. 8, the light source 120 emits omnidirectional light which is incident on the polarizing plate 121 and output therefrom as polarized light 127 oscillating in a given direction. This polarized light 127 is then incident on the liquid crystal plate 122. If, at this moment, a switch 128 is at its opened position and therefore the liquid crystal plate 122 is not being energized from a power source 129, said polarized light 127 will have its direction rotated by an angle of 90° and thus the P-polarized light is output from said liquid crystal plate 122.

The P-polarized light is transmitted through the mirror 123, then reflected on the total reflection mirrors 124, 126 and again transmitted through the mirror 123 to be projected onto the object 125.

If, at said moment, the switch 128 is at its closed position and therefore the liquid crystal plate 122 is being energized from the power source 129, no rotation of the polarized light will occur because liquid crystal molecules of the liquid crystal plate 122 are aligned in the direction of the optical axis. As a result, the polarized light will be transmitted through the liquid crystal plate 122 as the S-polarized light.

Such S-polarized light is reflected on the mirror 123 and then directly projected onto the object 125. Regarding this, the optical path for the P-polarized light is longer than the optical path for S-polarized light by $l = l_1 + l_2 + l_3$.

Figure 9:
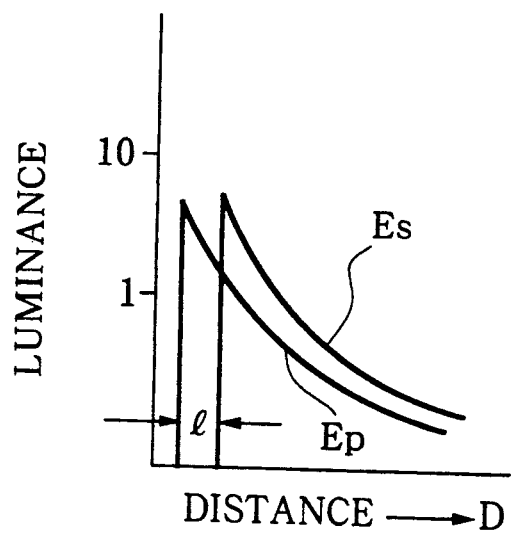
FIG. 9 is a graphic diagram showing characteristic curves of luminances on an object to be gauged.

With a consequence, the P-polarized light and the S-polarized light projected onto the object 125 have their characteristic curves Ep, Es plotted by a luminance on the object varying as function of a distance D, as shown by FIG. 9.

As will be understood from FIG. 9, a distance D to the object 125 can be determined on the basis of a ratio Ep/Es.

It should be understood that a distance between the light source 120 and the polarizing beam splitter mirror 123 is extremely short compared to the distance D to the object 125 and may be regarded as zero in determination of the distance D.

Figure 10:
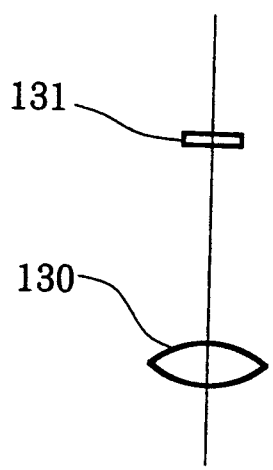
FIG. 10 is a schematic diagram of photoelectric converter means in this embodiment.

Referring to FIG. 10, there is schematically illustrated photoelectric converter means adapted to detect a luminance on the object 125 and convert this luminance to the corresponding electric signal.

This photoelectric converter means comprises a condenser 130 and a light receiver element 131 so that the light reflected on the object 125 is condensed by the condenser 130 and incident on the light receiver element 131 which generates, in turn, an electric signal corresponding to a luminance on the object 125.

Figure 11:
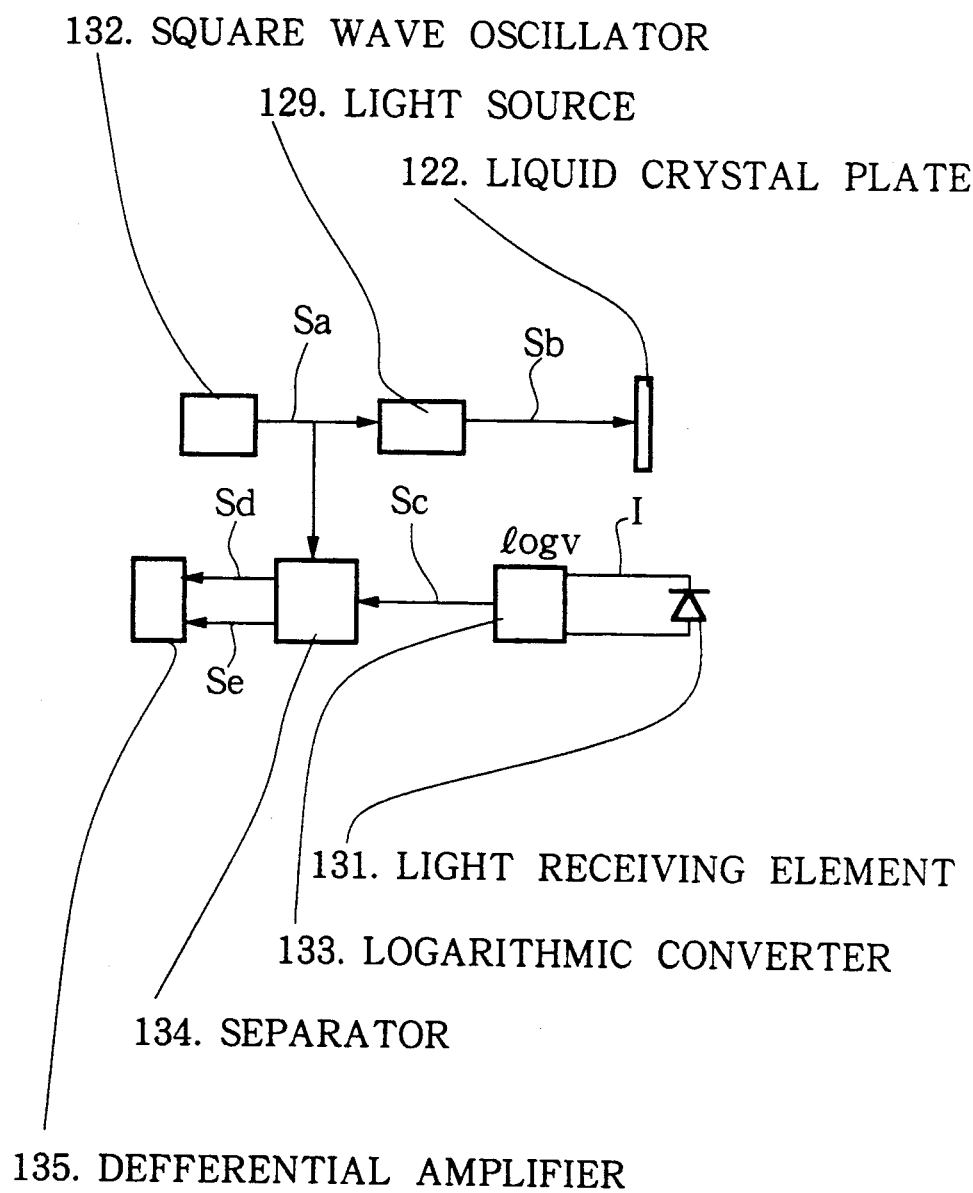
FIG. 11 is a schematic diagram of signal processor means in this embodiment.

FIG. 11 is a circuit diagram illustrating an example of the signal processor means comprising a square wave oscillator 132, a logarithmic converter 133, a separator 134 and a differential amplifier 135.

Figure 12:
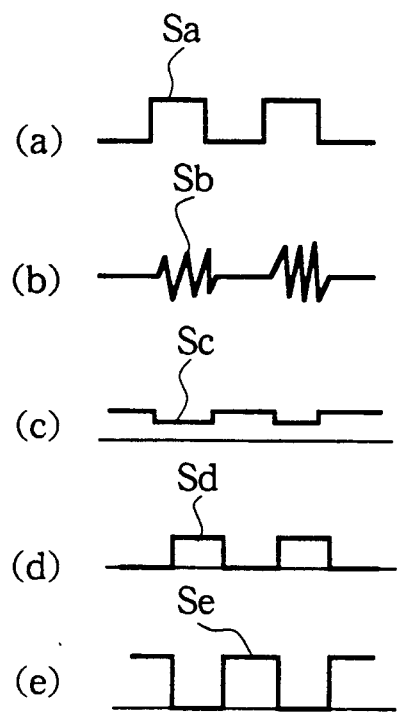
FIG. 12 is a waveform diagram illustrating how the signal processor means operates.

The logarithmic converter 133 converts a photoelectrically converted current I output from the light receiver element 131 to the corresponding voltage V by use of suitable means and supplies the separator 134 with a signal Sc as shown by (c) of FIG. 12, which has been formed by log-compression of said voltage V.

The separator 134 is supplied also from the square wave oscillator 132 with a timing signal Sa as shown by (a) of FIG. 12, with which the separator 134 operates to separates said log-compression signal Sc and thereby to generate signals Sd, Se as shown by (d) and (e), respectively, of FIG. 12.

More specifically, the signal Sa provided from the square wave oscillator 132 drives the power source 129, the liquid crystal plate 122 outputs the S-polarized light which is then received by the light receiver element 131, and the separator 134 is supplied with the log-compression signal Sc related to said S-polarized light and generates the signal Se.

When the power source 129 is driven, a drive voltage Sb as shown by (b) of FIG. 12 is applied to the liquid crystal plate 122.

When the power source 129 is turned OFF as the signal Sa from the square wave oscillator 132 is lowered to zero level, the liquid crystal plate 122 outputs the P-polarized light which is then received by the light receiver element 131, and the separator 134 is supplied with the log-compression signal Sc related to the P-polarized light in response to which the separator 134 generates the signal Sd.

The differential amplifier 135 includes an integrator adapted to integrate the respective signals Sd, Se output from the separator 134, and compares these integrated signals Sd, Se to form a differential signal thereof. In this manner, a distance D from the light source 120 to the object 125 can be determined on the basis of the difference between the respective signals Sd, Se, i.e., the ratio of the luminances on the object 125.

It should be noted here that the signals Sd, Se applied to the differential amplifier 135 often fail to exhibit the square waveform as shown in FIG. 12 particularly during rise-up time due to causes such as a delayed response of the liquid crystal plate 122 or the light receiver element 131. To overcome such inconvenience, a stabilized portion of the waveform may be sample-held and processed without integration of the signals Sd, Se to obtain a desired distance information. Alternatively, the photoelectrically converted signals may be A/D converted and then digitally processed for the same purpose.

Figure 13:
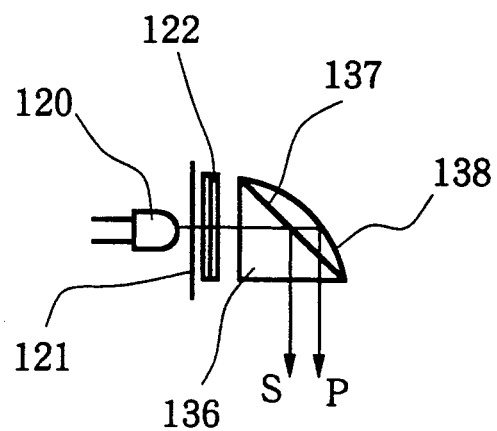
FIG. 13 is a schematic diagram showing a variant of the projector system.

Referring to FIG. 13, there is illustrated a variant of the projector system in which the polarizing beam splitter mirror 123 is replaced by a prism 136 having a slant face 137 serving as a polarizing beam splitter so that only the P-polarized light component is transmitted therethrough but the S-polarized light component of the light incident on the slant face 137 is reflected thereon, and said P-polarized light component is then reflected on a concave mirror 138.

While the concave mirror 138 is preferably hyperboloidal, a spherical mirror may be also useful so far as it functions so as to make a position of the light source remote from the P-polarized light component.

Although the instant embodiment has been described above as the specific case in which the P-polarized light component and the S-polarized light component are incident on the light receiver element 131, the light reflected on the object 125 actually need not to be maintained polarized as said P- and S-polarized light components. In other words, the object may have also a reflecting surface comprising ordinary materials tending to disturb the polarized light.

Figure 14:
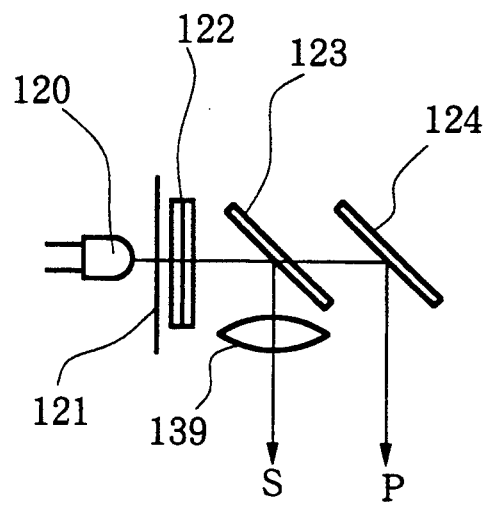
FIG. 14 is a schematic diagram showing another variant of the projector system.
Figure 15:
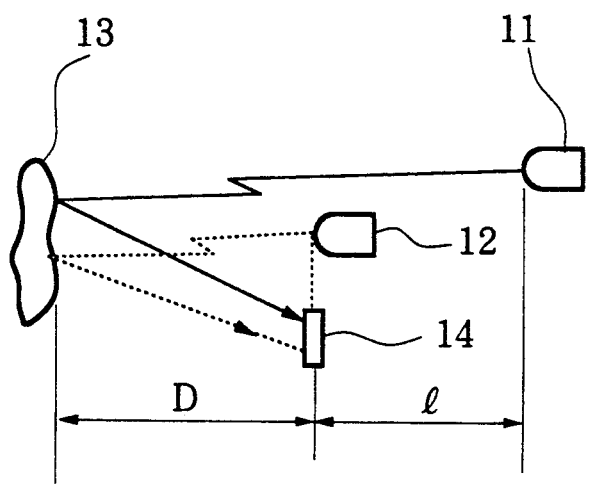
FIG. 15 is a schematic diagram showing by way of example the arrangement of prior art.
Figure 16:
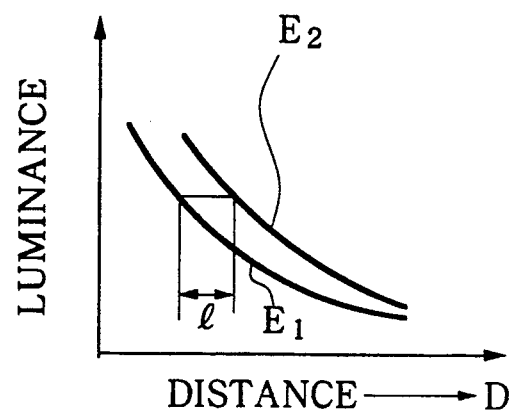
FIG. 16 is a graphic diagram showing characteristic curves of luminances on the object in this arrangement of prior art.

Finally referring to FIG. 14, there is illustrated another variant of the projector system in which the total reflection mirror 124 is placed in parallel to the polarizing beam splitter mirror 123 and a convex lens 139 is interposed between said mirror 123 and the object 125 so that the S-polarized light component is projected by the convex lens 139 onto the object 125 while the P-polarized light component is projected by the total reflection mirror 124 onto the object 125.

The convex lens 139 should be positioned so as to set the light source of the S-polarized light component as a virtual image on a remote point.

While the respective embodiments have been described hereinabove as utilizing the polarizing plate 121, such polarizing plate 121 will be unnecessary when a light source emitting polarized light such as a laser source is employed as the light source.

What is claimed is:

1. Optical gauging apparatus comprising divider means to divide light emitted from a single light source into a pair of light components propagated along a pair of optical paths, respectively; projector means to project the respective light components divided from a single light by the divider means onto an object to be gauged along a pair of different optical path lengths; shield means for intermittently shielding at least one of the light components propagated along the associated light path; and signal processor means for photoelectric conversion of the light components reflected on the object followed by time-division processing of photoelectric conversion signals to provide a desired gauging information.

2. Optical gauging apparatus as recited in Claim (1), wherein said shield means is adapted to shield the light components respectively propagated along a pair of optical paths in alternate and continuous mode.

3. Optical gauging apparatus as recited in Claim (1), wherein said shield means comprises a single liquid crystal plate placed in one of the optical paths or a pair of liquid crystal plates placed in a pair of optical paths, respectively.

4. Optical gauging apparatus as recited in Claim (1), wherein said divider means includes a half-mirror placed in the optical path along which the light emitted from the single light source is propagated and adapted to divide the light into one component transmitted therethrough and another component reflected thereon; and wherein said projector means is adapted to direct said light component having been reflected on said half-mirror to the total reflection mirror so that this light component is reflected on the total reflection mirror so as to be projected in the same direction as but along the optical path length differing from the component transmitted through the half-mirror.

5. Optical gauging apparatus comprising light emitter means for alternately emitting a pair of light components having different polarization characteristics; splitter means to split the pair of light components along different optical paths, respectively; projector means to project the pair of light components having been splitted by said splitter means to an object to be gauged along different optical path lengths: and signal processor means for photoelectric conversion of the light components having been reflected on the object followed by time-division processing of photoelectric conversion signals to provide a desired gauging information.

6. Optical gauging apparatus as recited in Claim (5), wherein said light emitter means comprises a single light source including a polarizing plate and a liquid crystal plate in the optical path of the light emitted therefrom; and wherein said light emitter means alternately emits a pair of light components having different polarization characteristics under controlled energization of said liquid crystal plate.

7. Optical gauging apparatus as recited in Claim (5), wherein said splitter means comprises a polarizing beam splitter mirror placed in the optical path of the light emitted from the light emitter means so that said polarizing beam splitter mirror splits the light incident thereon into a polarized light component transmitted therethrough and a polarized light component reflected thereon.

8. Optical gauging apparatus as recited in Claim (5), wherein said splitter means comprises a polarizing beam splitter mirror placed in the optical path of the light emitted from the light emitter means so that said polarizing beam splitter mirror splits the light incident thereon into a polarized light component transmitted therethrough and a polarized light component reflected thereon; and wherein said projector means is adapted to direct said polarized light component having been transmitted through said polarizing beam splitter mirror to the total reflection mirror so that this polarized light component is reflected on said total reflection mirror so as to be projected in the same direction as the other polarized light component and thereby the pair of light components having different polarization characteristics are projected along different optical paths, respectively.

9. Optical gauging apparatus as recited in Claim (5), wherein said splitter means comprises a polarizing beam splitter mirror placed in the optical path of the light emitted from the light emitter means so that said polarizing beam splitter mirror splits the light incident thereon into a polarized light component transmitted therethrough and a polarized light component reflected thereon; and wherein said projector means is adapted to direct said light having been transmitted through said polarizing beam splitter mirror to a concave mirror such as a hyperboloidal mirror so that this polarized light component is reflected on said concave mirror so as to be projected in the same direction as the other polarized light component and thereby the pair of light components having different polarization characteristics are projected along different optical paths, respectively.

10. Optical gauging apparatus as recited in Claim (5), wherein said splitter means comprises a polarizing beam splitter mirror placed in the optical path of the light emitted from the light emitter means so that said polarizing beam splitter mirror splits the light incident thereon into a polarized light component transmitted therethrough and a polarized light component reflected thereon; and wherein said projector means includes a convex lens placed in the optical path of the polarized light component having been reflected on said polarizing beam splitter mirror so that the polarized light component having been transmitted through said convex lens is reflected on the total reflection mirror so as to be projected in the same direction as the other polarized light component having been transmitted through said polarizing beam splitter mirror and thereby the pair of light components having different polarization characteristics are projected along different optical paths, respectively.

* * * * *